(12) United States Patent
Carey et al.

(10) Patent No.: US 6,674,934 B2
(45) Date of Patent: Jan. 6, 2004

(54) PRESSURE-ACTUATED BI-STABLE OPTICAL SWITCHING

(75) Inventors: Kent W. Carey, Palo Alto, CA (US); Tetsuya Hidaka, Tokyo (JP); You Kondoh, Kanagawa (JP); Mitsuchika Saito, Kanagawa (JP); Tsutomu Takenaka, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 77 days.

(21) Appl. No.: 09/992,843

(22) Filed: Nov. 6, 2001

(65) Prior Publication Data

US 2003/0086637 A1 May 8, 2003

(51) Int. Cl.[7] ................................................. G02B 6/35
(52) U.S. Cl. ........................................... 385/16; 385/18
(58) Field of Search ............................... 385/16, 18, 19

(56) References Cited

U.S. PATENT DOCUMENTS

| 5,699,462 | A | | 12/1997 | Fouquet et al. | |
|---|---|---|---|---|---|
| 5,828,799 | A | * | 10/1998 | Donald | 385/16 |
| 5,978,527 | A | | 11/1999 | Donald | |
| 6,072,924 | A | * | 6/2000 | Sato et al. | 385/18 |
| 6,408,112 | B1 | * | 6/2002 | Bartels | 385/16 |
| 6,487,333 | B2 | * | 11/2002 | Fouquet et al. | 385/18 |

FOREIGN PATENT DOCUMENTS

EP       1014140 A2    6/2000

OTHER PUBLICATIONS

Agilent, "Photonic Sw itching Platform Product Information," http://w w w .agilent.com/cm/photonicsw itch/productInfo/index.html.
NEL, "Thermo–Capillary Optical Sw itch," NTT Electronics, A pr., 2000.

* cited by examiner

Primary Examiner—Michael P. Stafira
Assistant Examiner—Juan D Valentin, II

(57) ABSTRACT

Pressure-actuated bi-stable optical switching is provided. In this regard, a pressure-actuated bi-stable optical switch includes an optical path and a cavity intersecting the optical path. The cavity defines a first position along the optical path and a second position displaced from the optical path. An index-matching liquid, which exhibits an index of refraction closer to an index of refraction of the optical path than to that of a vacuum, is arranged within the cavity. A pressure generator generates pressure that selective moves the liquid between the first and second positions. Additionally, a potential profile maintains the liquid in the one of the first and second positions to which it was most recently moved while the pressure generator is not generating pressure. Methods, systems and other switches also are provided.

27 Claims, 3 Drawing Sheets

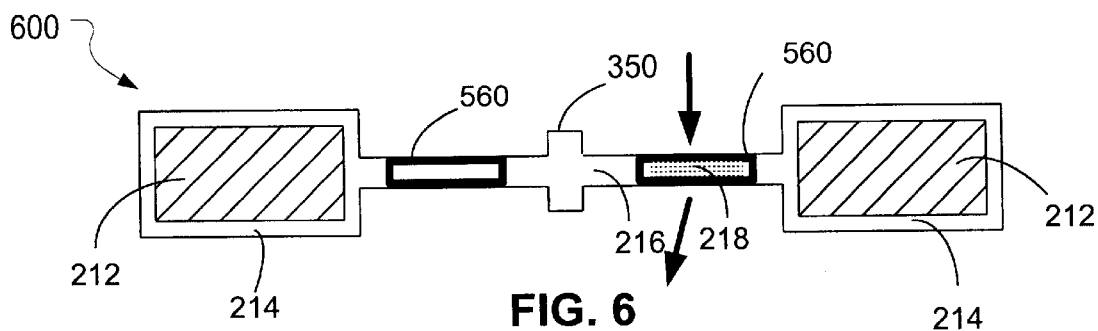
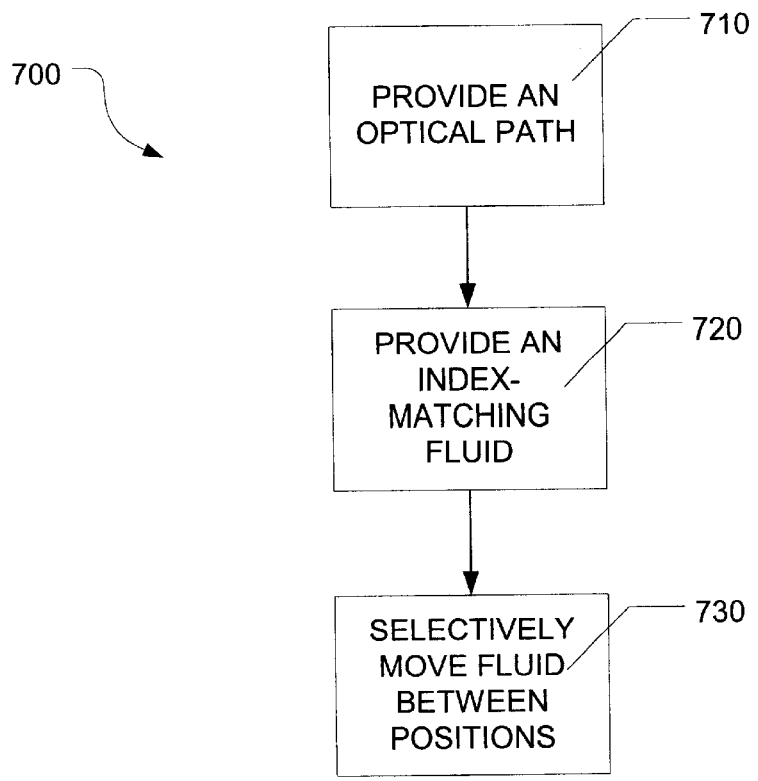

PRESSURE-ACTUATED BI-STABLE OPTICAL SWITCHING

TECHNICAL FIELD

The present invention relates to optics and, more particularly, to optical switches.

DESCRIPTION OF THE RELATED ART

Much of modern progress is associated with advances in computer and related technologies that generate exponentially increasing amounts of data, often exceeding the data-handling capacity of available communications channels. Accordingly, there has been a trend toward optical communications systems, which tend to offer greater capacity or "bandwidth" than electrically based communications systems.

One of the challenges confronting the development of optical communications is to develop optical analogues of devices used in electrical communications systems. For an example in which an analog has been successfully developed, optical fibers serve as an analogue for electrical cables. On the other hand, matrix switching is an area where further work is required in the optical domain.

Matrix switches are used for selectively routing individual input channels to individual output channels. While it is possible to convert optical signals to electrical signals and back to allow electrical matrix switches to be used, there are costs and latencies involved in the conversions. Accordingly, optical matrix switches have been developed that avoid the need for the conversion to the electrical domain.

Optical matrix switches have been developed having grids of intersecting waveguides. Switch elements at the intersections determine whether an optical signal is transmitted straight through the intersection or reflected along an orthogonal waveguide. To this end, the intersection may alternatively be filled with index-matching (for transmission) or non-index-matching (for reflection) fluid.

For example, Agilent Technologies has introduced its "Champagne" photonic switch platform. In this case, a chamber at a waveguide intersection is filled with index-matching fluid. The fluid can be heated so that a non-index-matching bubble is formed. Thus, the presence of the bubble causes light to be reflected, while the absence of the bubble causes light to be transmitted. Capillary geometry and wetting properties can stabilize the bubble to establish the desired switching condition. However, such switches require a constant supply of power to maintain the vapor bubble, although power need not be continually supplied to maintain the non-bubble condition. In this sense, then, the optical switch is stable only in the non-bubble condition, and is non-stable in the bubble condition. Such bubble-based switches are therefore problematic in applications where power consumption and/or power supply reliability are a problem. In addition, bubble switches can suffer from vapor lock caused by inadequate bubble removal. Champagne photonic switches are disclosed in European Patent Application No. 1,014,140, claiming priority to U.S. patent application Ser. No. 09/221,655, filed Dec. 23, 1998, both of which references are incorporated by reference. NTT Electronics has recently offered a thermo-capillary optical switch that is "self-latching." The switch relies on an oil latching interfacial variation effect, or "OLIVE," where index-matching oil is injected into a micro driving slit at the point where two waveguides intersect. When the surface tension of the oil is decreased by heating, thermo-capillary forces move the oil column towards the lower-temperature side of the slit. Once the oil is away from the intersection of the waveguides, the light path is switched by total internal reflection on the slit side wall. Although the OLIVE switch provides for latched operation, the actuation mechanism is inherently slow due to the large thermal mass that must be heated in order to change the state of the switch.

Thus, it should be appreciated that fast bi-stable optical switches are needed that preferably do not suffer from vapor lock.

SUMMARY OF THE INVENTION

The present invention provides for pressure-actuated bi-stable optical switching. Thus, an inventive switch and method uses pressure to move an index-matching liquid into and out of an optical path. Pressure is generated to move the liquid within a cavity that intersects the optical path. When the pressure moves the liquid into the optical path, light is transmitted; when the liquid is moved out of the optical path, light is reflected. In the absence of pressure, the liquid position can be maintained using a number of different phenonema. In addition to providing an individual switch element and a method, the invention provides for a matrix switch with pressure-actuated bi-stable switch elements, optical systems incorporating such switches, and corresponding methods.

The pressure can be applied by heating gas within the cavity. For example, the cavity can include gas reservoirs at opposite ends of the cavity; the liquid can be moved by heating the reservoir adjacent the fluid. In some embodiments, not all the liquid is moved; instead the pressure cleaves a slug of liquid forcing only a portion to move. When the liquid motion is reversed, the portion of the liquid that did not move helps stablize the returned liquid using surface tension. In addition to or in lieu of this mechanism, various embodiments of the invention use capillary shape or wettability profile or both to achieve latching.

The present invention differs in part from the Champagne technology described in the previous section in that the "motivating" gas is not generated from the index-matching liquid, but can be separate. Accordingly, the gas need not be created and removed, but simply expands and contracts. Thus, the problem of vapor lock facing Champagne technology can be avoided by the present invention. In addition, since a bubble need not be sustained to make the intersection non-index-matching, the inventive switch is bi-stable (self-latching in both conditions). In comparison to the OLIVE technology, the invention can provide for much faster switching, as the thermal mass that must be heated to move the index-matching fluid can be much less. Other advantages, in addition to or in lieu of the foregoing, are provided by certain embodiments of the invention as is apparent from the description below with reference to the following drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, like reference numerals have been used in the drawings to designate corresponding parts throughout the several views.

FIG. 6 is a partial horizontal cross-section of yet another embodiment of a pressure-actuated bistable optical switch of the invention.

FIG. 7 is a flow diagram for a method of switching an optical signal.

DETAILED DESCRIPTION

Figure 1:
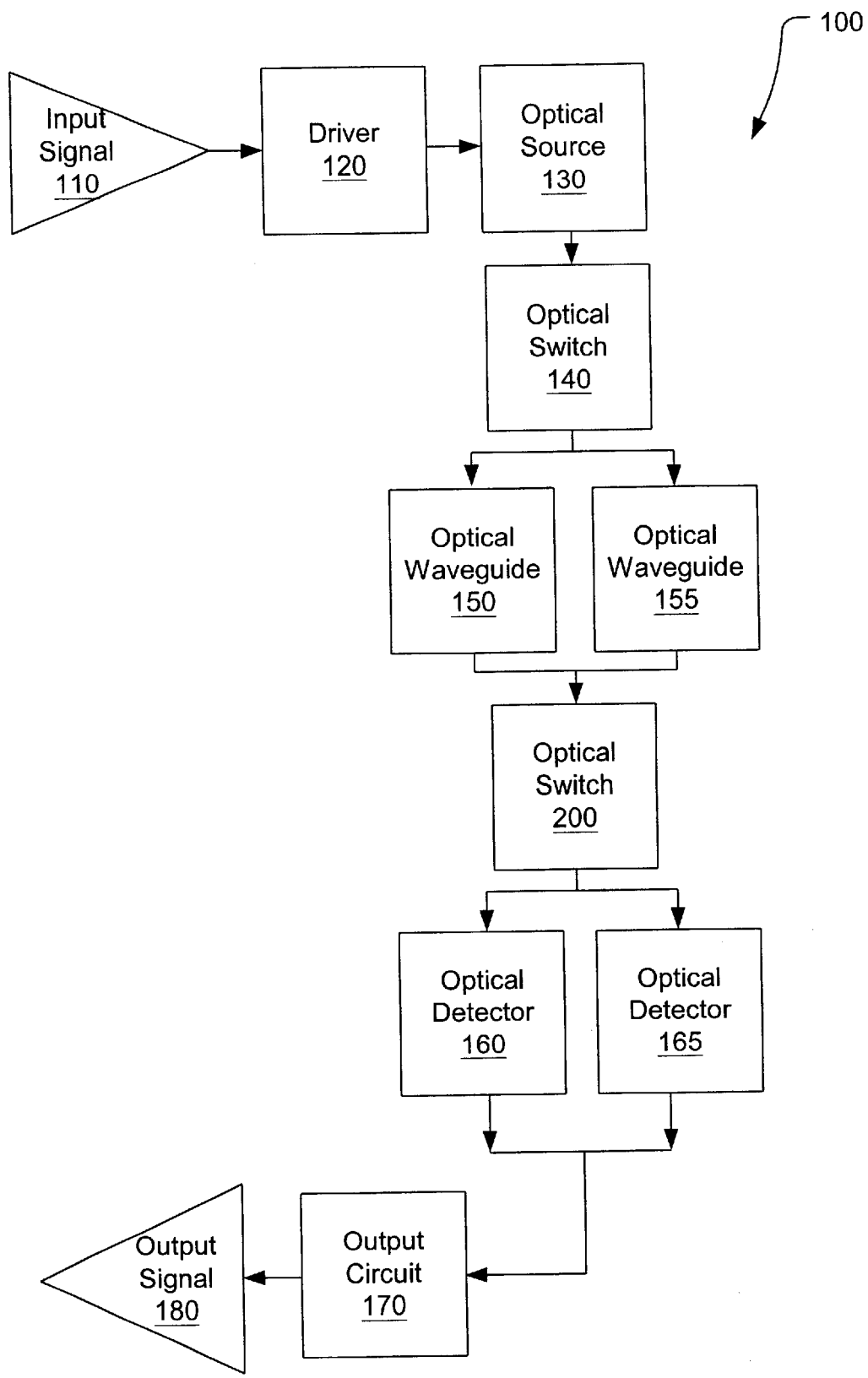
FIG. 1 is a conceptional block diagram of an embodiment of an optical communication system that can incorporate a pressure-actuated bistable switch of the invention.

FIG. 1 is a conceptual block diagram of an optical communication system 100 of the invention for exchanging information via light wave signals. In FIG. 1, an input signal 110 is provided to a driver 120 that controls an optical source 130. Light waves from the optical source 130 are provided to an optical switch 140 that connects the optical source 130 to one of the optical waveguides 150, 155. Light is transmitted by the selected waveguide 150 or 155 to a second optical switch 200, where it is directed to one of the optical detectors 160, 165. The output from the selected detector 160 or 165 is then sent to an output circuit 170 that produces an output signal 180. Of course, optical switches 140, 200 may also be utilized in other parts of the communication system 100, such as between waveguides 150 and 155, and in other systems where lightwave signals need to be switched between sources, waveguides, detectors, and/or other devices. The switching speed of the optical switches 140 and 200 is a significant factor in determining the capacity of the network 100.

Figure 2:
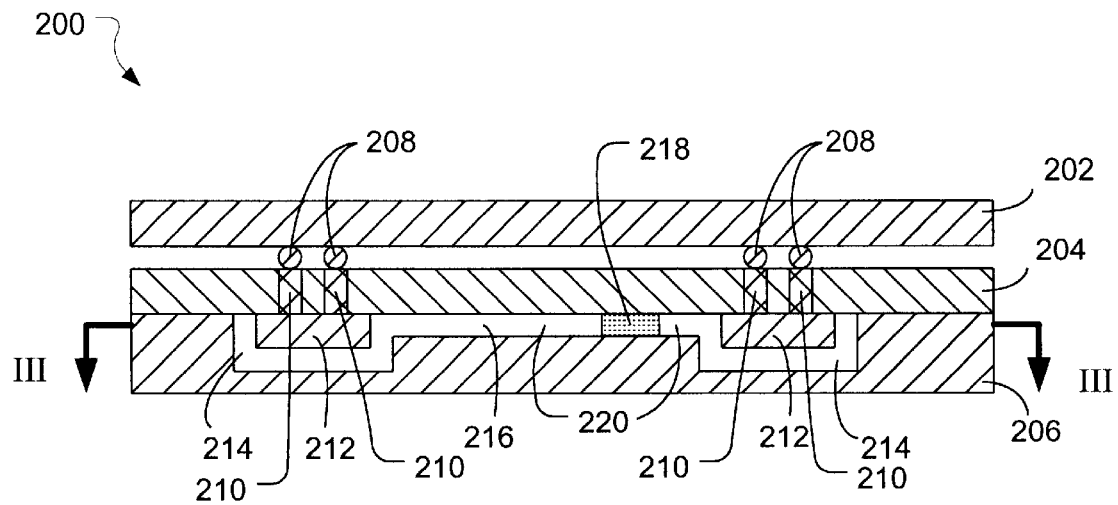
FIG. 2 is a vertical cross-section of an embodiment of a pressure-actuated bistable switch of the invention.

FIG. 2 is a vertical cross-section of an embodiment of the pressure-actuated bistable optical switch 200 shown in FIG. 1. The detailed description of switch 200 also applies (to some extent) to switch 140 of FIG. 1. The switch 200 includes three layers—a silicon driver layer 202, a heater layer 204, and a waveguide layer 206. These layers allow the switch 200 to be fabricated from conventional materials using well-known fabrication technology. For example, the driver layer 202 is preferably a semiconductor material while the heater layer 204 may be glass, or other insulating material. The waveguide layer 206 can be formed from a transparent material, such as glass or plastic, preferably matched to a refractive index of optical waveguides that may be coupled to the waveguide layer 206, but are not shown in the FIGs.

Bond pads 208 are arranged on one side of the silicon driver layer 202 in order to provide electrical power and/or other signals that are conducted through the vias 210 in heater layer 204 for reception by transducers 212. Each of the transducers 212 is arranged in its own reservoir 214 that is connected by a conduit 216 to a corresponding reservoir for the other transducer. However, a different number of transducers, reservoirs and/or conduits may also be used. As discussed below, the conduit 216 is preferably sized so that capillary effects predominate for fluid(s) in the conduit. The conduit 216 is therefore sometimes also referred to as a "capillary."

However, conduits 216 with larger sizes may also be used. The spaces between the walls of the reservoirs 214 and their transducers may also be sized similarly or differently from the conduit 216.

The transducers 212 convert electrical energy from the vias 210 into other forms. The converted energy is then used to move a fluid in the conduit 216. For example, the transducers 212 pump, compress, or otherwise pressurize the fluid in the reservoirs 214 in order to move the same or a different fluid in the conduit 216. In one embodiment, one or both of the transducers 212 move fluid in the reservoirs 214 without significantly changing a physical phase of the fluid in the reservoirs 214 near the transducers 212. For example, a liquid may be moved without significant vaporization since the formation of bubbles in the capillary may decrease the positional stability of the liquid. However, a portion of the fluid in the reservoir 214 near a heater-type transducer 212 may be vaporized or cavitated if bubble-jet type fluid pumping is used. Similarly, liquid in the reservoir is preferably moved without the formation of ice crystals that could interfere with the desired flow in the capillary. For example, the liquid may be an oil and/or a solvent with a known and stable wettability in connection with the materials that coat the capillary. The fluid in the conduit 216 will preferably have a refractive index that is matched to any optical waveguides (not shown) that are attached to the switch 200.

In yet another embodiment, the transducers 212 move fluid in the capillary by changing a surface tension of the fluid in the reservoirs 214. The change in surface tension is preferably, but not necessarily, reversible. For example, the transducers 212 may be heaters (and/or coolers) for increasing (and/or decreasing) a temperature of liquid (or semi-liquid) fluid and causing a corresponding decrease (and/or increase) in surface tension. However, various other types of fluids and energy output from the transducers 212 may also be used to affect the cohesive forces between the molecules in the fluid and/or adhesive forces between the fluid and the walls of the capillary. For example, certain liquid metals (including mercury) and semimetals (including high-temperature gallium) will exhibit a change in surface tension under an applied voltage. Other liquid and/or semi-liquid substances (such as gel polymers) will exhibit a change in surface tension when subject to mechanical energy, such as high-frequency vibrations. The transducers 212 may therefore provide any form of energy (including nuclear, mechanical, chemical, electrical, and/or electromagnetic energy) that will change a surface tension of the corresponding fluid in the reservoirs 214, preferably without changing the phase of the fluid (such as by vaporizing or solidifying).

"Surface tension" is a term that is often used to explain various capillary effects. The surface tension in a drop of liquid typically acts like an elastic skin to pull the liquid into a sphere in order to minimize the surface area of the drop. This phenomenon arises from the inward attractive "cohesion" forces of the liquid being much stronger than the outward attractive forces of the surrounding vapor. For liquids, surface tension generally decreases with increasing temperature and the addition of impurities in the fluid. For example, "surfactants," such as detergents, that congregate at the surface of the liquid are particularly effective at reducing surface tension.

When a liquid or semi-liquid is in contact with a solid, however, the attractive "adhesion" forces between the liquid and solid can be greater than the cohesive forces between the molecules of the liquid. The resulting "capillarity" will affect the shape of the liquid surface near the liquid-solid interface. For example, water will form a "meniscus" curved surface near the edges of a glass container. For solid surfaces that are close together, these capillary effects can extend completely across a narrow channel of liquid. In that case, the liquid will either be drawn into the capillary channel or repelled by the capillary depending upon the "wettability" of the solid surface inside the capillary for that particular liquid (or semi-liquid). For example, a highly wettable, or "hydrophillic," capillary surface will draw liquid into the capillary. In contrast, a capillary having a "hydrophobic" surface will generally resist the flow of liquid into the capillary. The terms "fluidphillic" and "fluidphobic" are also used when describing capillary topographies associated with fluids that may include gases, vapors, liquids and/or semi-liquids similar to hydrofillicities for just liquids.

In one embodiment, the fluid in the conduit 216 is a liquid slug 218 (shown in FIGS. 2 and 6) bounded at one or both ends by a gas (or vapor) which experiences a transient rise (or drop) in temperature and corresponding rise (or drop) in pressure caused by electrical pulse (or other energy source) applied to a heater-type transducer 212 in the reservoir 214. This rise (or drop) in pressure causes gas in the reservoir 214 to expand and move the fluid from one position to another position further from (or closer to) the pressure source. The gas is preferably inert, has low solubility (or is immiscible) with the liquid slug 218, and/or does not contain oxygen. For example, nitrogen may be used. In switch 200, the pressue actuation is done by heating a gas in the reservoirs by resistive heating. As an alternative to a resistive heater, another type of transducer might be used for heating the gas.

The liquid slug 218 is positionable in the capillary so as to affect light transmission through that portion of the capillary. For example, the conduit 216 may be positioned in a light transmission path (not shown), such as in a gap between two sections of an optical waveguide in a planar lightwave circuit. The liquid slug 218 is then positioned in the conduit 216 so as to affect light transmission from one section of the waveguide to the other, such as by attenuation, dispersion, refraction, polarization, wavelength filtering, and/or other effects. For example, the light from one section of waveguide is preferably transmitted to the other section of the waveguide, or reflected from the walls of the capillary, depending upon the position of the liquid slug 218 in the conduit 216.

The liquid slug 218 will have at least one, but preferably two or more, position(s) in the conduit 216 where it will exhibit stability. These portions are sometimes referred to as "potential wells" and are separated by a "potential ridge."Preferably, the liquid slug 218 will be maintained in one of these equilibrium configurations, even when subjected to small perturbations. For example, when the liquid is slightly displaced from one of these equilibrium positions, it will tend to restore itself to the equilibrium position. The fluid may also exhibit positional stability with regard to small perturbations in temperature, pressure, and/or surface tension. In this equilibrium position, the fluid will affect light transmission through the fluid as discussed above.

The stable positioning of the fluid may be implemented by a variety of capillary topographies and/or other structures affecting capillarity. For example, a change in capillary topography may include a change in fluidphilicity and/or a change in geometry of the capillary. In a preferred embodiment, the capillary topography will include a change in wettability and/or size of the capillary. For example, the inside wall of the capillary may switch from hydrophillic to hydrophobic (or merely less hydrophillic) or from narrow to wide.

Figure 3:
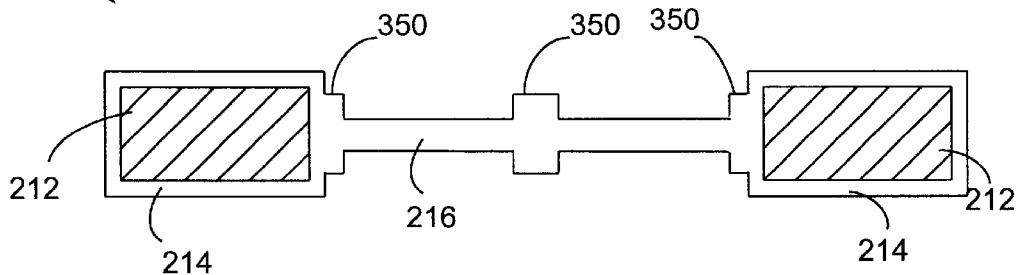
FIG. 3 is a partial horizontal cross-section taken along section III—III in FIG. 2.

FIG. 3 is a partial horizontal cross-section of one embodiment of a pressure-activated bistable optical switch 300 taken along section line E-III in FIG. 2, without the liquid slug 218. FIG. 3 is an example of a capillary topography including a change in size of the capillary. In particular, the switch 300 has enlarged portions 350 arranged near a central portion of the capillary and, optionally, near the reservoir 214. For round capillaries, the enlarged portions 350 will have a larger diameter. For capillaries of other shapes, the enlarged portions will have at least one larger dimension in comparison to the smaller portions of the capillary. This dimension (e.g., diameter) is generally referred to as a "width" and may be provided in any angle relative to an axis of the capillary.

Figure 4:
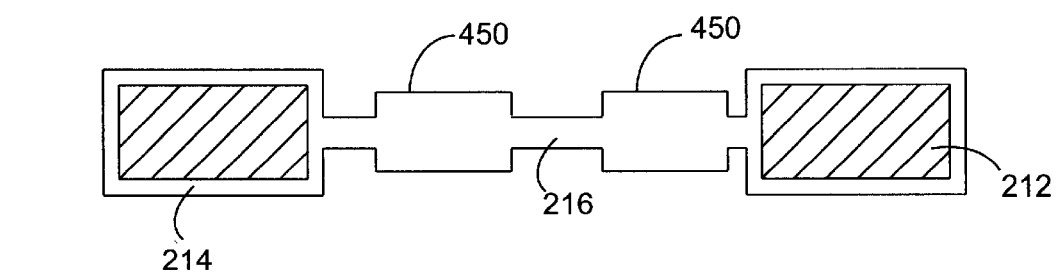
FIG. 4 is a partial horizontal cross-section of another embodiment of a pressure-actuated bistable optical switch of the invention.

Although FIG. 3 illustrates a channel 216 with three enlarged portions 350, any other number of enlarged portions may also be provided. Also, the enlarged portions 350 may be provided at other positions along the capillary, including in the reservoir 214 and/or conduit 216. Furthermore, the transition between different widths (or other geometries) in the capillary may be step-wise or continuous so as to provide a more gradual transition between the different widths. For example, FIG. 4 illustrates another embodiment of a pressure-actuated bistable switch 400 in which two enlarged portions 450 are provided in the conduit 216 rather than a single enlarged portion 350 (FIG. 3).

Figure 5:
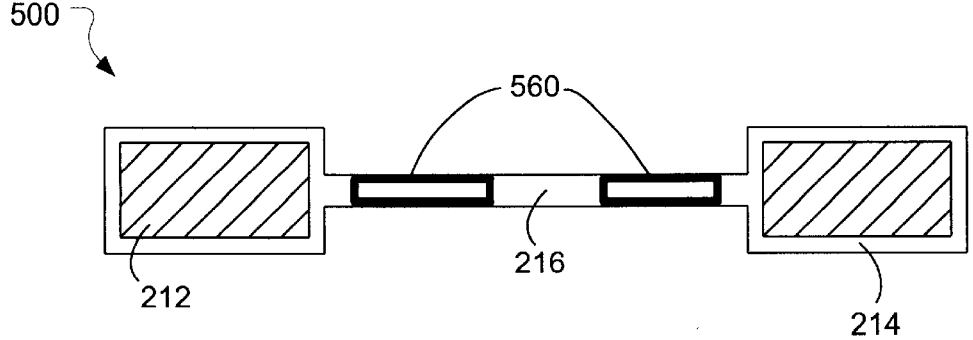
FIG. 5 is a partial horizontal cross-section of yet another embodiment of a pressure-actuated bistable optical switch of the invention.

FIG. 5 illustrates yet another embodiment of a pressure-actuated bistable optical switch 500 in which the change in capillary geometry includes two portions 560 having a different wettability than other portions of the capillary. The term "change in wettability" is broadly used here to include increases, decreases, and/or reversals of fluidphilicity, fluidphobicility, hydrophilicity, hydrophobicity, and/or other aspects of the internal surface of the capillary that will increase and/or decrease the adhesion forces between the fluid, or fluids, and the walls of the capillary. As with geometric changes in capillary topography, any number of wettability changes may be provided at various positions, and for various distances, along the capillary. These changes may also be step-wise or gradual. They may also occur around the entire internal perimeter of the capillary or just a portion of the internal perimeter. For example, the change in wettability may be provided as a strip of coating material, such as a linear, circular, or helical strip, on the capillary wall. Alternatively, the wettability of the capillary 216 may be changed by using different materials, coatings, and/or surface textures for the interior surface of the capillary.

FIG. 6 illustrates yet another embodiment of a pressure-actuated bistable switch 600 including both geometric and wettability changes in its capillary topography. In particular, FIG. 6 illustrates the capillary conduit 216 including an enlarged central portion 350 and two sections 560 having a different wettability than a remainder of the capillary. The portions 560 will be highly wettable, or hydrophillic while the remainder of the capillary is non-wettable, or hydrophobic, for the chosen liquid slug 218.

In the configuration shown in FIG. 6, a fluid, such as nitrogen gas, in the reservoir 214 on one side is heated, or otherwise pressurized, by transducer 212 in the reservoir. As the gas pressure in the reservoir 214 rises, the liquid slug 218 is forced out of the highly wettable section 560, through the enlarged central portion 350, and into the highly-wettable section 560 on the opposite side. At that point, the pressure of the nitrogen gas (or other fluid) in the opposite reservoir 214 rises and resists further movement of the slug 218. In addition, the liquid slug 218 is drawn into the opposite (left) highly-wettable section 560.

When power to the heated transducer 212 is switched off, the gas in the corresponding reservoir 214 will begin to cool and the gas pressure on one side of the liquid slug 218 will begin to drop. However, the liquid slug 218 will be prevented from moving back to its original position by the high-wettability of section 560. In addition, any portion of the liquid slug 218 that is drawn out by the highly-wettable section 560 will be prevented from moving to the other side of the switch 600 by the enlarged central portion 350.

In this way, the liquid slug 218 can be stably positioned in either of two locations in the capillary 216 due to the wettability and/or geometry of the capillary. In addition, since the liquid slug 218 is moveable in the capillary 216 by heat-pressurized gas on one side of the slug 218, the slug can be moved quickly using relatively little energy as compared to devices that require heating and/or vaporization of a liquid in order to provide adequate pressure variations. One possible optical path through the slug 218 is shown by the bold arrows in FIG. 6.

FIG. 7 is a flow diagram for one embodiment of a method for switching an optical signal 700. The method 700 includes the step of providing an optical path at step 710. At step 720, an index-matching fluid is provided so that it is selectively movable between a first position and a second position where the first position is arranged along the optical path and the second position is displaced from the optical path. For example, potential wells may be arranged at each of the first and second positions with a potential ridge disposed there between. At step 730, the fluid is selectively moved from the first position to the second position, such as by a pressure generator.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims.

What is claimed is:

1. An optical switch comprising:
   an optical path;
   a cavity intersecting said optical path to define a first position along said optical path and a second position displaced from said optical path;
   an index-matching liquid within said cavity, said index-matching liquid having an index of refraction closer to an index of refraction of said optical path than to that of a vacuum; and
   a pressure generator for generating pressure that selectively moves said liquid between said first and second positions;
   wherein said cavity exhibits a potential profile for, while said pressure generator is not generating pressure, maintaining said liquid in the one of said first and second positions to which said liquid was most recently moved, and wherein said potential profile is formed by a first surface in the cavity having a first wettability, and a second surface in the cavity having a second wettability, the first wettability being different than the second wettability.

2. The optical switch of claim 1, wherein one of the first and second surfaces is hydrophilic and the other of the first and second surfaces is hydrophobic.

3. The optical switch of claim 1, wherein said potential profile is formed by:
   a third surface in said cavity having said first wettability; and
   wherein said first and third surfaces are arranged on opposite edges of the second surface.

4. The optical switch of claim 1, wherein said pressure generator is a transducer.

5. The optical switch of claim 1, wherein said cavity is a capillary.

6. The optical switch of claim 5, wherein said potential profile is formed by:
   a first length of the capillary having a first surface with a first wettability; and
   a second length of the capillary having a second surface with a second wettability, the first wettability being different than the second wettability.

7. The optical switch of claim 6, wherein one of the first and second surfaces is hydrophilic and the other of the first and second surfaces is hydrophobic.

8. The optical switch of claim 7, wherein the pressure generated by the pressure generator is a negative pressure.

9. The optical switch recited in claim wherein said potential profile is formed, at least in part, by a change in size of said cavity.

10. A method for switching an optical signal comprising:
    providing an optical path;
    providing an index-matching liquid selectively movable between a first position defined by a first surface having a first wettability and a second position defined by a second surface having a second wettability, the first wettability being different than the second wettability, the first position being arranged along the optical path, the second position being displaced from the optical path; and
    selectively moving the liquid from the first position to the second position and vice versa with a force, the liquid being stable in the position to which it was most recently moved, such that when the liquid is in the first position, an optical signal propagated along the optical path is directed to a first location, and when the liquid is in the second position, the optical signal is directed to a second location.

11. The method of claim 10, wherein the index-matching liquid has an index of refraction closer to an index of refraction of the optical path than to that of a vacuum.

12. The method of claim 11, further comprising:
    providing a pressure generator; and
    wherein the force is generated by the pressure generator.

13. The method of claim 12, wherein the pressure generator is a transducer.

14. The optical switch recited in claim 13, wherein said transducer includes a thermal energy generator.

15. The optical switch recited in claim 14, wherein said thermal energy generator is a heater.

16. A communication system comprising:
    an optical switch optically communicating with an input transmission medium, said optical switch defining an optical path, said optical switch having a cavity intersecting said optical path to define a first position that is defined by a first surface having a first wettability along said optical path and a second position that is defined by a second surface having a second wettability displaced from said optical path, the first wettability being different than the second wettability, an index-matching liquid within said cavity, said index-matching liquid having an index of refraction closer to an index of refraction of said optical path than to that of a vacuum, and a pressure generator for generating pressure that selective moves said liquid between said first and second positions, said cavity exhibiting a potential profile for, while said pressure generator is not generating pressure, maintaining said liquid in the one of said first and second positions to which it was most recently moved.

17. The communication system of claim 16, further comprising:

an input transmission medium optically communicating with said optical switch.

18. The communication system of claim 16, further comprising:

a first output transmission medium optically communicating with said optical switch; and a second output transmission medium optically communicating with said optical switch;

wherein, when said liquid is moved to said first position, light propagated along said optical path is directed to said first output transmission medium and when said liquid is moved to said second position, light propagated along said optical path is directed to said second output transmission medium.

19. An optical switch comprising:

a cavity intersecting an optical path, said cavity including
a first potential well located along said optical path,
a second potential well displaced from said optical path, and
a potential ridge disposed between said potential wells;

an index-matching liquid within cavity, said index-matching liquid having an index of refraction closer to an index of refraction of said optical path than to that of a vacuum; and a pressure generator for generating pressure that selective moves said liquid between said first and second potential wells.

20. An optical switch as recited in claim 19, wherein said cavity has a smaller cross section at said potential ridge than at said potential wells.

21. An optical switch as recited in claim 19, wherein said pressure generator includes gas within said cavity and a heater for heating said gas.

22. An optical switch as recited in claim 19, wherein said cavity includes a capillary.

23. A method of switching an optical signal being transmitted along an optical path, said method comprising generating pressure so as to move an index-matching liquid between a first potential well having a first wettability along said path and a second potential well having a second wettability displaced from said path, the first wettability being different than the second wettability.

24. A method as recited in claim 23, wherein said pressure is generated by heating a gas adjacent to said liquid.

25. A method as recited in claim 23, wherein said first and second potential wells are separated by a potential ridge.

26. A method as recited in claim 25, further comprising creating said first and second potential wells and said potential ridge within a cavity that is narrower at said potential ridge than at said potential wells.

27. A method as recited in claim 25, further comprising creating said first and second potential wells and said potential ridge within a cavity that is either more or less wettable at said potential ridge than at said potential wells.

* * * * *